United States Patent
Sawanishi et al.

(10) Patent No.: US 9,935,344 B2
(45) Date of Patent: Apr. 3, 2018

(54) TEST BATTERY CASE AND TEST BATTERY

(71) Applicant: ELIIY Power Co., Ltd., Tokyo (JP)

(72) Inventors: Keisuke Sawanishi, Tokyo (JP); Tomitaro Hara, Tokyo (JP)

(73) Assignee: ELIIY POWER CO., LTD., Tokyo (JP)

( * ) Notice: Subject to any disclaimer, the term of this patent is extended or adjusted under 35 U.S.C. 154(b) by 578 days.

(21) Appl. No.: 14/388,495

(22) PCT Filed: Mar. 22, 2013

(86) PCT No.: PCT/JP2013/058327
§ 371 (c)(1),
(2) Date: Sep. 26, 2014

(87) PCT Pub. No.: WO2013/146596
PCT Pub. Date: Oct. 3, 2013

(65) Prior Publication Data
US 2015/0072197 A1 Mar. 12, 2015

(30) Foreign Application Priority Data
Mar. 30, 2012 (JP) ................. 2012-081199

(51) Int. Cl.
*H01M 10/48* (2006.01)
*H01M 10/0525* (2010.01)
(Continued)

(52) U.S. Cl.
CPC ....... *H01M 10/48* (2013.01); *H01M 10/0525* (2013.01); *H01M 10/4285* (2013.01); *H01M 10/0566* (2013.01)

(58) Field of Classification Search
None
See application file for complete search history.

(56) References Cited

U.S. PATENT DOCUMENTS 3,818,325 A * 6/1974 Boshers ............. G01R 31/3658
324/434
4,251,568 A * 2/1981 Hart ..................... H01M 10/365
429/49

(Continued)

FOREIGN PATENT DOCUMENTS

| JP | 2001-338674 A | 12/2001 |
| JP | 2006-244832 A | 9/2006 |

(Continued)

OTHER PUBLICATIONS

Federal Register, vol. 76, No. 27 issued Feb. 9, 2011 which details Supplementary Examination Guidelines for Determining Compliance with 35 U.S.C. 112 and for Treatment of Related Issues in Patent Applications, pp. 7162-7175.*

(Continued)

*Primary Examiner* — Ula C Ruddock
*Assistant Examiner* — Amanda Barrow
(74) *Attorney, Agent, or Firm* — Stites & Harbison, PLLC; Jeffrey A. Haeberlin; Rachel D. Rutledge

(57) ABSTRACT

The present invention provides a test battery case which is capable of conducting an internal short-circuit test with accuracy. The test battery case according to the present invention includes a container for housing a power generating element, and a closing member detachably secured to the container, wherein the container has an opening for the internal short-circuit test, the opening being closed by the closing member.

5 Claims, 7 Drawing Sheets

(51) Int. Cl.
*H01M 10/42* (2006.01)
*H01M 10/0566* (2010.01)

(56) References Cited

U.S. PATENT DOCUMENTS

| | | | | |
|---|---|---|---|---|
| 4,990,098 | A * | 2/1991 | Neidecker | H01R 25/162 174/117 F |
| 6,140,927 | A * | 10/2000 | Whitmire | B60L 11/1851 320/112 |
| 6,944,010 | B1 * | 9/2005 | Paul | H01G 9/02 361/502 |
| 2008/0038632 | A1 * | 2/2008 | Hamada | H01M 2/0237 429/177 |
| 2008/0066298 | A1 * | 3/2008 | Lin | H01M 10/049 29/623.1 |
| 2008/0143337 | A1 * | 6/2008 | Fujikawa | H01M 10/052 324/426 |
| 2008/0186029 | A1 | 8/2008 | Nishino et al. | |
| 2010/0035128 | A1 * | 2/2010 | Scordilis-Kelley | H01M 4/581 429/50 |
| 2010/0062324 | A1 * | 3/2010 | Ooyama | H01M 2/0404 429/97 |
| 2010/0209767 | A1 * | 8/2010 | Kasamatsu | H01M 6/50 429/178 |
| 2011/0159327 | A1 * | 6/2011 | Hardwick | H01M 10/4285 429/90 |
| 2011/0159328 | A1 * | 6/2011 | Yeo | H01M 2/0212 429/94 |
| 2011/0250485 | A1 * | 10/2011 | Tsukuda | H01M 2/021 429/153 |
| 2011/0305932 | A1 * | 12/2011 | Doshi | H01M 6/5038 429/94 |
| 2012/0021261 | A1 * | 1/2012 | Kim | H01M 2/1205 429/53 |
| 2012/0107650 | A1 * | 5/2012 | Kritzer | F16K 31/084 429/53 |

FOREIGN PATENT DOCUMENTS

| | | | | |
|---|---|---|---|---|
| JP | 2008-039459 | * | 2/2008 | G01N 1/22 |
| JP | 2008-039459 | A | 2/2008 | |
| JP | 2008-192497 | A | 8/2008 | |
| JP | 2008-270090 | A | 11/2008 | |
| JP | 2010-135186 | A | 6/2010 | |
| JP | 2010-250954 | A | 11/2010 | |
| JP | 2011-198744 | A | 10/2011 | |

OTHER PUBLICATIONS

ISA/JPO, International Search Report in corresponding international application PCT/JP2013/058327, dated May 21, 2013.

European Patent Office, Extended European Search Report, issued in corresponding EP Application No. 13768708.3, dated Nov. 18, 2015.

European Patent Office, Examination Report issued in corresponding Application No. 13768708.3, dated Jun. 27, 2017.

* cited by examiner

[Fig. 1]
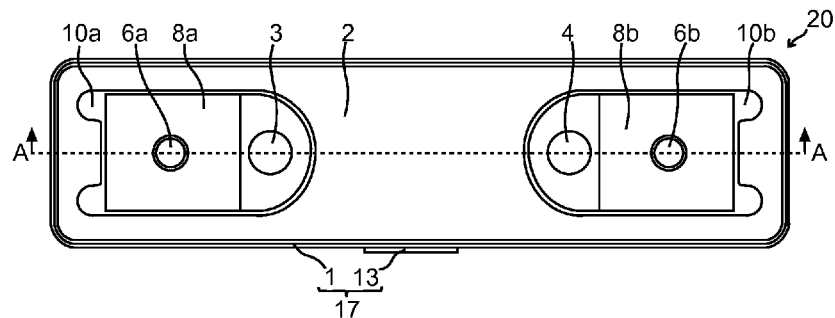
[Fig. 2]
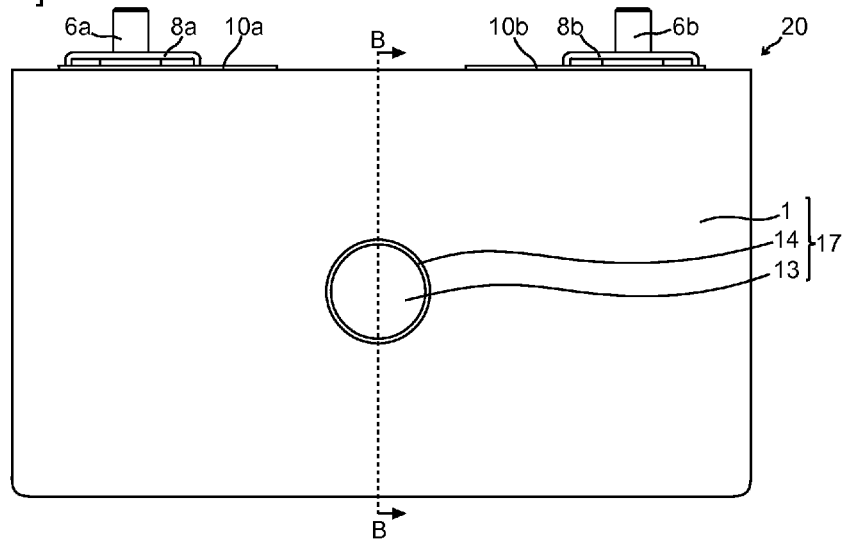
[Fig. 3]
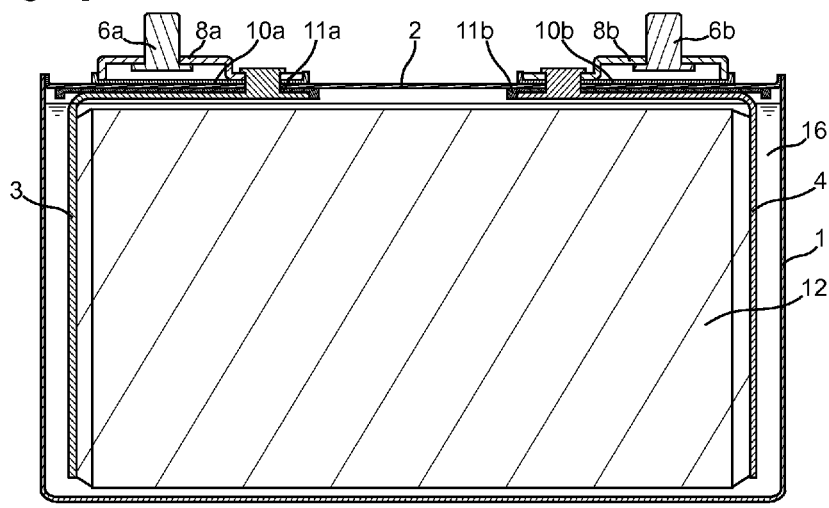

[Fig. 4]
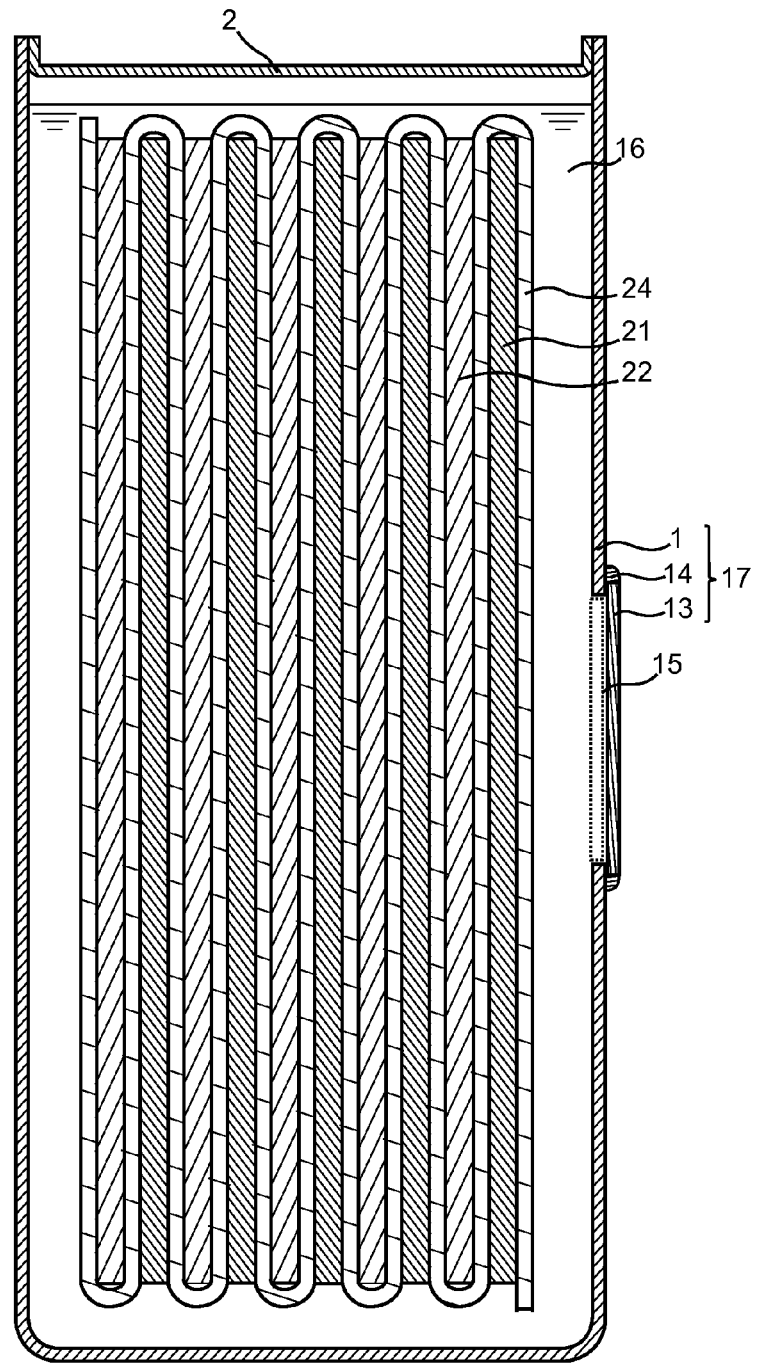

[Fig. 5]
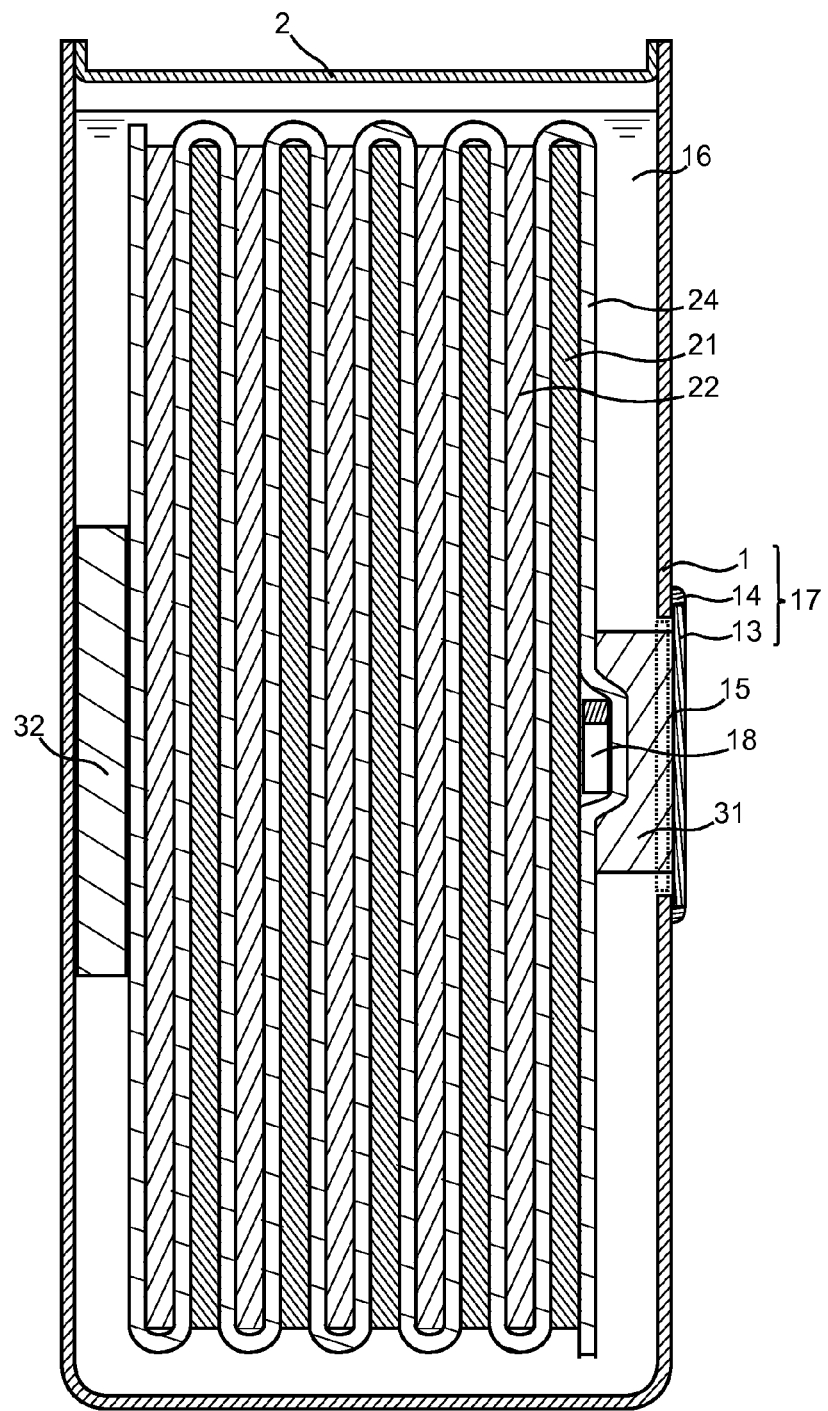

[Fig. 6]
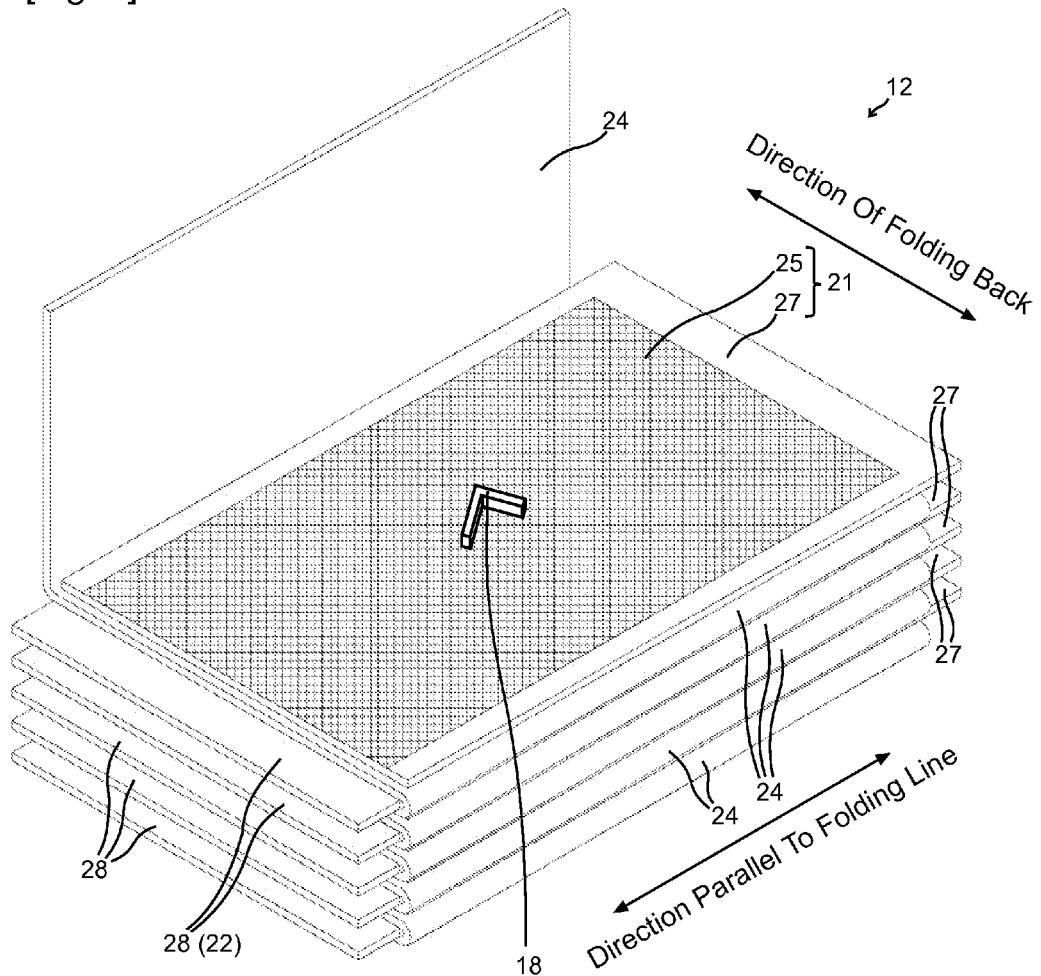

[Fig. 7]
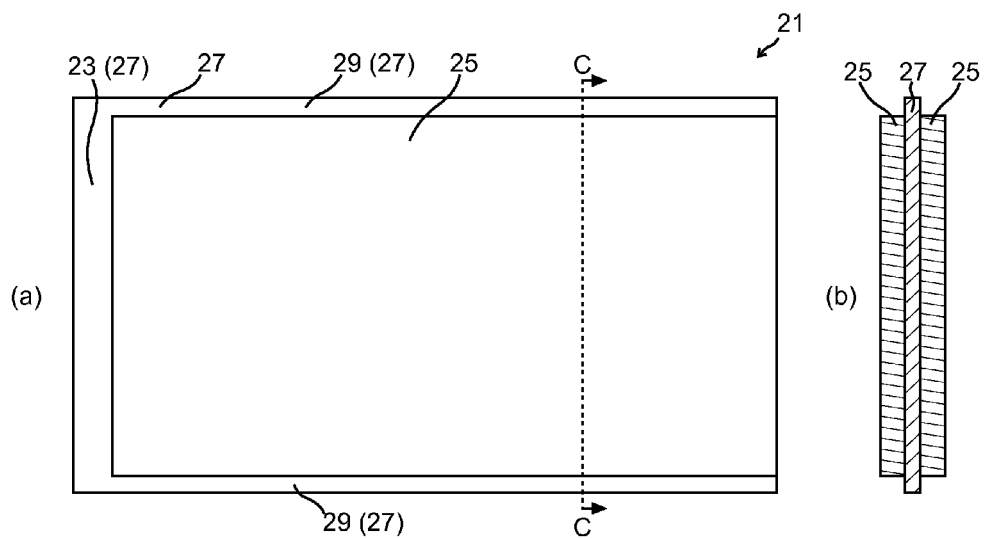
[Fig. 8]
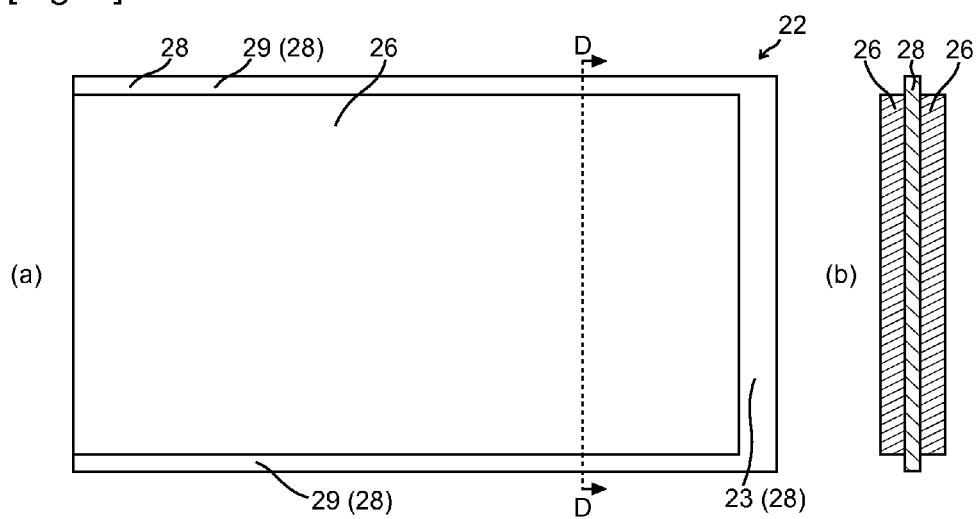

[Fig. 9]
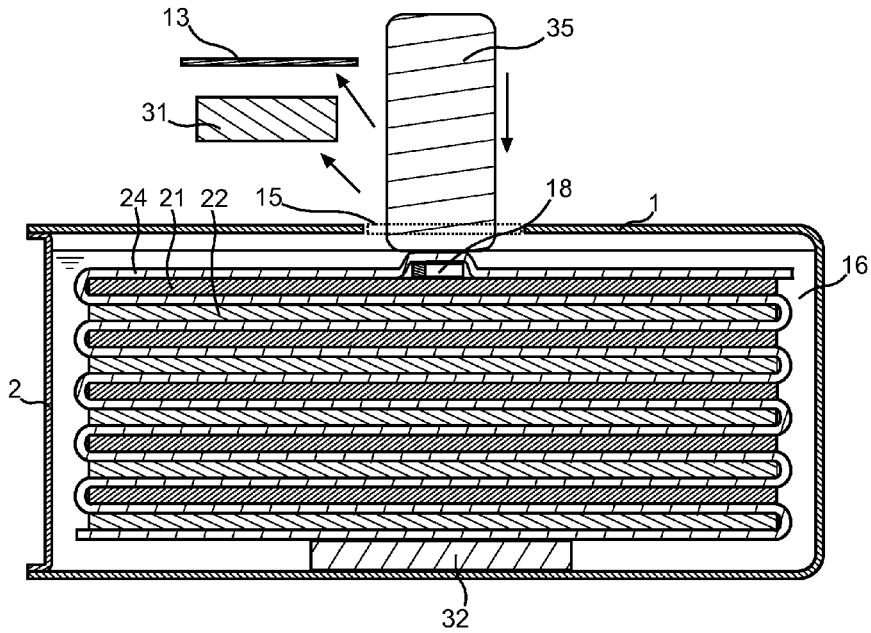
[Fig. 10]
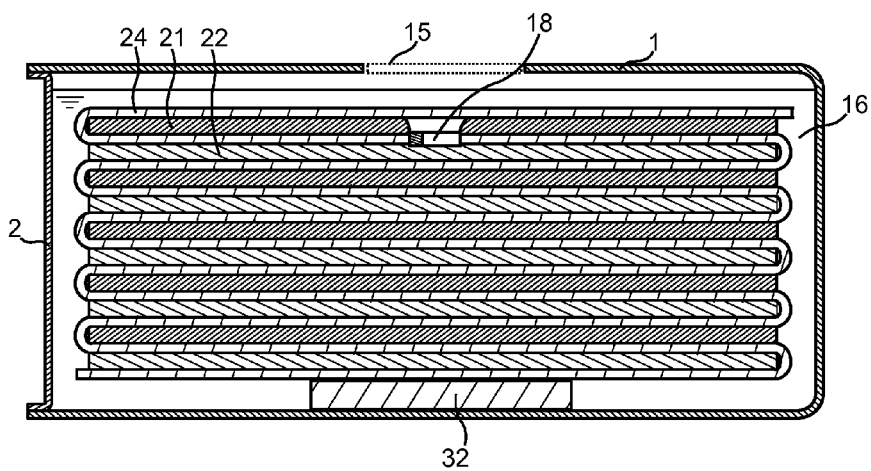

[Fig. 11]
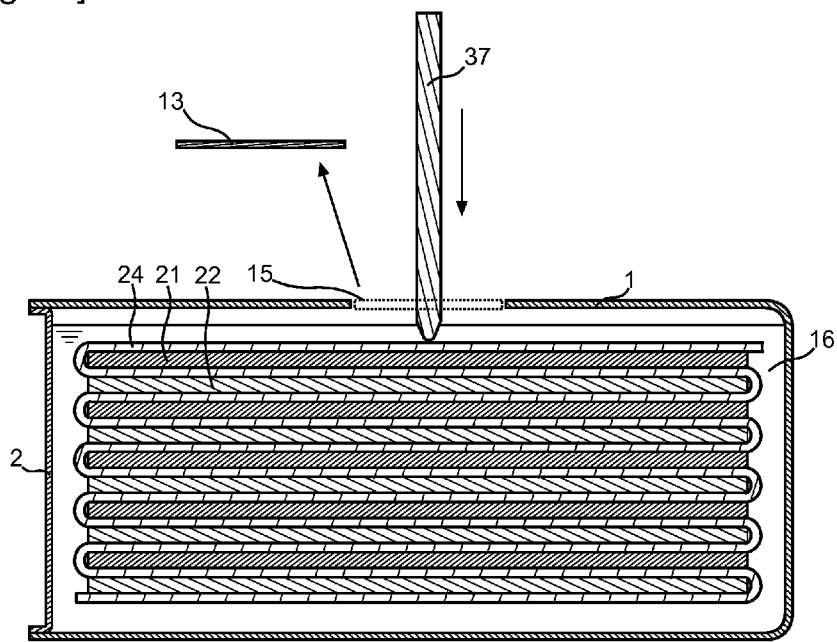
[Fig. 12]
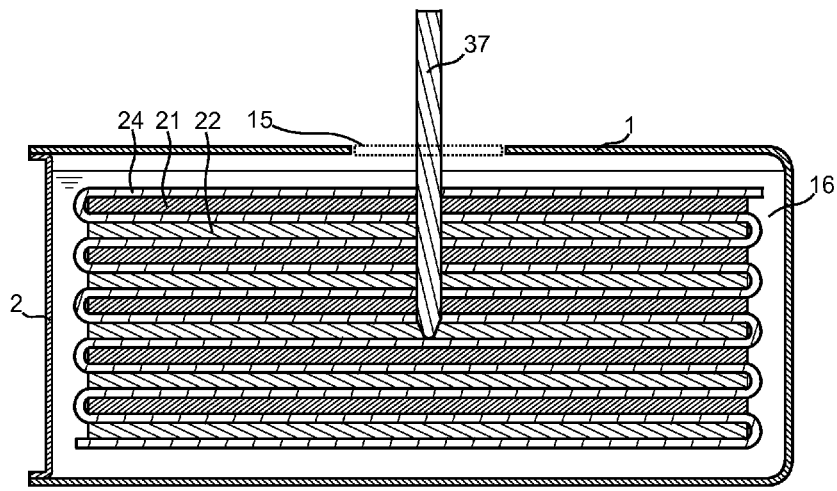

TEST BATTERY CASE AND TEST BATTERY

TECHNICAL FIELD

The present invention relates to a test battery case and a test battery.

BACKGROUND ART

In recent years, accidents in secondary batteries have occurred. Particularly, ignition and fuming accidents in lithium-ion secondary batteries have been rapidly increased.

In lithium-ion secondary batteries, metal oxides which are easily destabilized in high-temperature conditions are used for positive electrode materials, and electrolytic solutions contain organic solvents. Therefore, when such lithium-ion secondary batteries are in high-temperature conditions, ignition and fuming accidents easily occur. Further, as a cause for which lithium-ion secondary batteries are in high-temperature conditions, there have been mentioned internal short-circuits due to metal particles precipitated in these batteries during charging. Further, there has been the following problem: intrusion of foreign substances during manufacturing of batteries. There have been reports of accidents of short-circuits caused by such foreign substances during use of batteries.

In order to prevent such ignition and fuming accidents, Japanese Industrial Standards (JIS) define safety tests for lithium-ion secondary batteries (for example, JIS C8714 and JIS C 8715-2). As such safety tests according to Japanese Industrial Standards, there are mentioned various tests such as a crushing test, an external short-circuit test, and a forced internal short-circuit test.

Such a forced internal short-circuit test is defined as quickly disassembling a sealing port portion in a charged single battery, taking out an electrode body from a case, disposing a nickel small piece with a determined shape as a test metal piece between an electrode and a separator in an outermost portion, and thereafter, putting the electrode body back into the case, pressing a portion where the test metal piece is disposed, to induce a short-circuit between a positive electrode and a negative electrode, and determining whether or not ignition or fuming occurs.

In large-sized batteries, when a battery has a case made of a rigid material, such as a metal case, the battery has a large electric capacity, and if the case is disassembled and a power generating element is taken out in a charged condition, danger is brought. Therefore, it has been impractical that such a battery is disassembled and the power generating element is taken out. Therefore, in order to easily disassemble the battery even in a charged condition, a forced internal short-circuit test has been conducted by preparing a battery having a pouch made of a laminate film as an alternative battery case.

PRIOR ART DOCUMENT

Patent Document

Patent Document 1: Japanese Patent Laid-open Publication No. 2011-198744

SUMMARY OF THE INVENTION

Problems to be Solved by the Invention

However, a battery having a case made of a rigid material, and a battery having a pouch made of a laminate film as an alternative battery case are different from an actual product in terms of heat dissipation properties of a battery, an amount-of-liquid ratio of an active material to an electrolytic solution, a current collection structure, and the like, and reliability of a forced internal short-circuit test is deteriorated. Further, in a battery having a structure in which current collectors at both ends of a power generating element are firmly secured by welding or the like, there is the following problem: it is practically impossible to introduce a test metal piece therein, by taking out the power generating element and loosening a separator, after charging. On the other hand, JIS standards define a proviso as follows. That is, when it is significantly difficult to detach an electrode body in a single battery charged, from a battery casing, a manufacturer may preliminarily insert a test metal piece into the single battery during fabrication of the battery or in a discharging condition, and then conduct charging. However, a method for merely disposing a test metal piece in a battery causes the following problems: if a test metal piece is preliminarily placed therein during fabrication, the test metal piece may be displaced, thereby making a position of the test metal piece uncertain; and the test metal piece may damage a power generating element during a fabrication process. This makes it significantly difficult to conduct an accurate test. Further, it is expected that an internal short-circuit occurs during operations for pulling off a separator, placing a nickel small piece and putting it back into a case in a charged single battery. Thus, preparing operations have involved danger, and there has been a need for carefully performing the operations.

Further, in a blunt nail test and an internal short-circuit test using a copper nail and the like, with a battery having a case made of a rigid material, it has been sometimes impossible to conduct these tests because the nail cannot penetrate the case.

The present invention has been made in view of such circumstances and provides a test battery case and a test battery which are capable of improving reliability of an internal short-circuit test.

Solutions to the Problems

The present invention provides a test battery case including a container for housing a power generating element, and a closing member detachably secured to the container, and the container has an opening for an internal short-circuit test, the opening being closed by the closing member.

Effects of the Invention

According to the present invention, a test battery case includes a container for housing a power generating element, and a closing member detachably secured to the container, and the container has an opening for an internal short-circuit test, the opening being closed by the closing member. Therefore, it is possible to change the opening for the internal short-circuit test, to an opened state, from a state of being closed by the closing member, by detaching the closing member from the container. By creating a battery using this battery case, the battery is charged in the state where the opening is closed by the closing member, and thereafter, the closing member is detached to change the state to the state where the opening is opened, so that the internal short-circuit test can be conducted using the opening. Thus, by using the test battery case according to the present invention, it is possible to conduct an internal short-circuit test, for the battery in a state substantially equal to that of a battery to be manufactured and sold. This enables a test to be conducted with higher accuracy.

BRIEF DESCRIPTION OF THE DRAWINGS

FIG. 1 is a schematic top view illustrating a structure of a test battery according to an embodiment of the present invention.

FIG. 2 is a schematic side view illustrating the structure of the test battery according to the embodiment of the present invention.

FIG. 3 is a schematic cross-sectional view of the test battery, taken along a dotted line A-A in FIG. 1.

FIG. 4 is a schematic cross-sectional view of the test battery, taken along a dotted line B-B in FIG. 2.

FIG. 5 is a schematic cross-sectional view of a test battery according to the embodiment of the present invention.

FIG. 6 is an explanatory view of a power generating element included in a forced internal short-circuit test battery according to the embodiment of the present invention.

FIG. 7(a) is a schematic plan view of a positive electrode included in the test battery according to the embodiment of the present invention, and FIG. 7(b) is a schematic cross-sectional view of the same, taken along a dotted line C-C in FIG. 7(a).

FIG. 8(a) is a schematic plan view of a negative electrode included in the test battery according to the embodiment of the present invention, and FIG. 8(b) is a schematic cross-sectional view of the same, taken along a dotted line D-D in FIG. 8(a).

FIG. 9 is an explanatory view of a forced internal short-circuit test using the test battery according to the embodiment of the present invention.

FIG. 10 is an explanatory view of the forced internal short-circuit test using the test battery according to the embodiment of the present invention.

FIG. 11 is an explanatory view of a blunt nail test using the test battery according to the embodiment of the present invention.

FIG. 12 is an explanatory view of the blunt nail test using the test battery according to the embodiment of the present invention.

EMBODIMENT OF THE INVENTION

A test battery case according to the present invention includes a container for housing a power generating element, and a closing member detachably secured to the container, and the container has an opening for an internal short-circuit test, the opening being closed by the closing member.

In the present invention, the internal short-circuit test includes a forced internal short-circuit test, a blunt nail test, a nail sticking test, and the like.

The test battery case according to the present invention preferably includes a sealing member which is secured to the container together with the closing member, and the sealing member preferably seals a gap between the container and the closing member.

With this structure, it is possible to seal the test battery case by the sealing member, which can prevent an electrolytic solution from leaking through the opening for the internal short-circuit test in the container.

In the test battery case according to the present invention, the container is preferably made of a rigid material.

With this structure, it is possible to conduct an accurate internal short-circuit test, for a battery having the container made of the rigid material.

The present invention also provides a test battery including the test battery case according to the present invention, the power generating element, and a non-aqueous electrolyte containing a lithium salt. The power generating element includes negative electrodes, positive electrodes, and a separator interposed between the negative electrodes and the positive electrodes, and the test battery houses the power generating element and the organic electrolytic solution.

With the test battery according to the present invention, the battery can be charged in a state where the opening for the internal short-circuit test is closed by the closing member, and thereafter, the closing member is detached to change the state to a state where the opening is opened, so that the internal short-circuit test can be conducted using the opening. Thus, with the test battery in a state substantially equal to that of a battery to be manufactured and sold, it is possible to conduct the internal short-circuit test. This enables a test to be conducted with higher accuracy. Further, since the same constituents as those in the battery to be manufactured and sold can be used as most of constituents of the test battery according to the present invention, costs of the internal short-circuit test can be reduced.

The test battery according to the present invention includes a test metal piece made of a metal such as nickel. The test metal piece is preferably disposed between an electrode which is located at an outermost position closer to the case opening, and the separator at an outermost position closer to the case opening, in the power generating element.

With this structure, when the closing member is detached from the test battery and the opening for the forced internal short-circuit test is in the opened state, it is possible to press a portion of the power generating element where the test metal piece is disposed, through the opening with a short-circuit test pressing jig. Thus, a short-circuit between a positive electrode and a negative electrode can be induced forcibly.

Preferably, the test battery according to the present invention includes an elastic member, and the elastic member is disposed between the test metal piece and the closing member. Further, a first elastic member preferably has a thickness larger than a thickness of the opening for the forced internal short-circuit test in the case, that is, a thickness larger than a plate thickness of the case in a surface of the case which is provided with the opening.

With this structure, the elastic member can cover and suppress, with an appropriate force, expansion of the power generating element which is caused by the disposition of the test metal piece. This can suppress displacement of a position of the test metal piece disposed within the power generating element caused by liquid flows during liquid injection, vibrations during manufacturing processes, and the like.

The test battery according to the present invention preferably includes a clearance adjustment member disposed so as to be interposed between the battery case and a surface of the power generating element which is opposite from a surface provided with the test metal piece. The clearance adjustment member can press the power generating element toward the elastic member, so that the power generating element can be pressed more firmly by the elastic member, thereby preventing the power generating element from moving within the battery due to liquid flows during liquid injection, vibrations during manufacturing processes, and the like.

Further, the power generating element can be pressed toward the opening by the clearance adjustment member. Accordingly, when the power generating element is pressed by the short-circuit test pressing jig during the forced internal-short circuit test, a stroke of the short-circuit test pressing jig is shortened, which can prevent insufficient pressurization due to a limit of a pressing distance in the device. Accordingly, a pressing force from the jig can be reliably transmitted to the test metal piece, thereby causing the test metal piece to penetrate through the separator and an electrode. This enables the forced internal short-circuit test to be conducted with higher accuracy.

The test battery according to the present invention preferably includes a positive electrode connection terminal and a negative electrode connection terminal, and the positive electrodes are preferably electrically connected to the positive electrode connection terminal, and the negative electrodes are preferably electrically connected to the negative electrode connection terminal.

With this structure, it is possible to conduct charging and discharging through the positive electrode connection terminal and the negative electrode connection terminal, and a battery reaction is allowed to progress in the positive electrodes and the negative electrodes.

In the test battery according to the present invention, the positive electrodes preferably include a positive electrode active material layer including an active material capable of extraction/insertion of lithium ions, such as a metal oxide containing lithium, an olivine type compound, and an electrically conductive polymer, the negative electrodes include a negative electrode active material layer including an active material capable of extraction/insertion of lithium ions, such as carbon, a Si compound, and a Sn compound, and the organic electrolytic solution is a solution prepared by dissolving a lithium salt solute in an organic solvent. In addition, the electrolytic solution and the electrodes may include various additives.

With this structure, it is possible to form various combinations of an active material and a solution in the test battery, and it is possible to easily and safely conduct a test regarding an active material and a solution which easily cause ignition and fuming.

Hereinafter, an embodiment of the present invention will be described with reference to the drawings. Structures which are illustrated in the drawings and the following description are merely illustrative, and the scope of the present invention is not limited to those illustrated in the drawings and the following descriptions.

Structure of Test Battery Case and Test Battery

FIG. 1 is a schematic top view illustrating a structure of a test battery according to the present embodiment, and FIG. 2 is a schematic side view illustrating the structure of the test battery according to the present embodiment. Further, FIG. 3 is a schematic cross-sectional view of the test battery, taken along a dotted line A-A in FIG. 1, and FIG. 4 is a schematic cross-sectional view of the test battery, taken along a dotted line B-B in FIG. 2. Further, FIG. 5 is a schematic cross-sectional view of the test battery according to the present embodiment, corresponding to the schematic cross-sectional view of the test battery taken along the dotted line B-B in FIG. 2. Further, FIG. 6 is an explanatory view of a power generating element included in the test battery according to the present embodiment. FIG. 7(a) is a schematic plan view of a positive electrode included in the test battery according to the present embodiment, and FIG. 7(b) is a schematic cross-sectional view of the same, taken along a dotted line C-C in FIG. 7(a). FIG. 8(a) is a schematic plan view of a negative electrode included in the test battery according to the present embodiment, and FIG. 8(b) is a schematic cross-sectional view of the same, taken along a dotted line D-D in FIG. 8(a).

In the present embodiment, a test battery case 17 includes a container 1 for housing the power generating element 12, and a closing member 13 which is detachably secured to the container 1, and the container 1 has an opening 15 for a forced internal short-circuit test, the opening 15 being closed by the closing member 13.

In the present embodiment, a test battery 20 includes the test battery case 17 according to the present embodiment, the power generating element 12, and an organic electrolytic solution 16. The power generating element 12 includes negative electrodes, positive electrodes, and a separator interposed between the negative electrodes and the positive electrodes, and the battery case 17 houses the power generating element and the organic electrolytic solution.

Hereinafter, the test battery case 17 and the test battery 20 according to the present embodiment will be described.

1. Test Battery Case

The test battery case 17 according to the present embodiment includes the container 1 for housing the power generating element 12, and the closing member 13 which is detachably secured to the container 1. Further, the test battery case 17 may also include a lid member 2 and a sealing member 14.

The container 1 can interiorly house the power generating element 12, a positive electrode connection terminal 3, a negative electrode connection terminal 4, and a non-aqueous electrolyte 16, and the container 1 can be joined to the lid member 2.

A material of the container 1 is not particularly limited as long as it is a material which is not greatly deformed even when the container houses the power generating element 12, the positive electrode connection terminal 3, the negative electrode connection terminal 4 and the organic electrolytic solution 16, and is, for example, a metal material such as aluminum, an aluminum alloy, iron, an iron alloy or stainless steel, such a metal material plated with nickel, tin, chromium, zinc or the like, or a rigid plastic.

The container 1 may have a rectangular shape or a cylindrical shape.

The material of the container 1 is preferably made of a rigid material such as the aforementioned metal material. Accordingly, it is possible to effectively utilize the opening 15 for the internal short-circuit test which is included in the test battery case 17 according to the present embodiment.

The container 1 has an opening for inserting the power generating element 12 into the container 1. Further, this opening is closed by the lid member 2. Accordingly, the power generating element 12 can be housed inside the container 1.

The container 1 has the opening 15 for the internal short-circuit test. The opening 15 is used for the internal short-circuit test which will be described later. A position where the opening 15 is provided is not particularly limited as long as it is a position which can be used for the internal short-circuit test. The position can be set to a position where a test metal piece 18, positive electrodes 21, a separator 24, and negative electrodes 22 can be interposed between the container 1 and the short-circuit test pressing jig, by inserting the short-circuit test pressing jig into the container 1 through the opening 15. Further, the position where the opening 15 is provided can be set to a position where the positive electrodes 21, the separator 24, and the negative electrodes 22 can be interposed between the container 1 and a test nail, or a position where the test nail penetrates through a positive electrode 21, the separator 24, and a negative electrode 22, by inserting the test nail into the container 1 through the opening 15.

Further, the opening 15 is closed by the closing member 13.

The opening may have various shapes such as circular shapes, rectangular shapes, polygonal shapes, and the like. Also, the opening may have a shape tapered from an outer side toward an inside of the opening, such as a mortar shape. The opening preferably has a size equal to or larger than a size of the internal short-circuit test jig.

The closing member 13 is detachably secured to the container 1 to close the opening 15. Since the closing member 13 closes the opening 15, the organic electrolytic solution 16 is prevented from leaking through the opening 15, and the battery can be sealed. By fabricating the test battery 20 using the test battery case 17, it is possible to conduct charging and discharging of the test battery 20.

The closing member 13 may be directly secured to the container 1 by bonding, caulking, fitting, welding, may be secured to the container 1 by providing the sealing member (joining member) 14, or may be secured by a screw structure.

The closing member 13 is only required to have an opening strength to an extent in which the closing member 13 is not opened by normal charging/discharging of the battery. The closing member 13 preferably has an opening strength generally equal to that of a safety valve provided in the battery.

When the closing member 13 is directly secured to the container 1 by bonding, adhering, caulking, fitting, welding or the like for closing and sealing the opening 15, a material of the closing member 13 can be, for example, a metal which can be generally used as a battery case, such as aluminum and stainless steel, a resin which can be generally used, such as silicone, polyolefin, a fluorocarbon resin or polyester, or a laminate made of the metal and the resin.

The closing member 13 may have a film shape, a sheet shape, a foil shape, or a thin-plate shape, and the closing member 13 preferably has flexibility. The closing member 13 is only required to close the opening 15 in the container, and may have a size equal to or larger than that of the opening 15. When the closing member 13 has a film shape or a sheet shape, the closing member 13 may be secured so as to cover an entire surface of the container where the opening 15 is provided. Further, the closing member 13 may be provided with a tab or a handle which makes it easier to pull the closing member 13, such as a pull tab. With this structure, the closing member 13 can be easily stripped off, thereby improving operability.

When the closing member 13 is attached to the opening 15 by caulking or fitting, the opening 15 and the closing member 13 can be preliminarily processed into shapes which can be subjected to caulking or fitting.

When the closing member 13 is attached to the opening 15 by bonding or adhering, the closing member 13 may be attached by using an adhesive, a thermally-adhesive material, solder, a brazing material, and the like.

When the closing member 13 is attached to the opening 15 by welding, the closing member 13 may be attached by various welding methods, such as resistance welding, laser welding, and ultrasonic welding.

Also, the opening 15 and the closing member 13 may have a strippable structure, by forming a fracture groove at a portion of the container by pressing and the like, and by attaching a tab thereto, as in a beverage can with a pull tab.

The closing member 13 may also be secured to the container 1 by providing the sealing member (joining member) 14. The sealing member 14 may be any member capable of closing a gap between the container and the closing member 13, such as a gasket or packing. A material of the sealing member 14 is preferably a material with flexibility since it is required to have hermeticity. Further, the material of the sealing member 14 preferably has resistance to electrolytic solutions, since an organic solution is used as the electrolytic solution. In the sealing member 14, a resin which can be generally used for a battery, such as silicone, polyolefin, a fluorocarbon resin and polyester, can be used.

When the sealing member 14 is used, the closing member 13 may be any member capable of preventing liquids and gasses from passing therethrough, and preferably has a structure like a plate or a plug which is made of a metal or a resin.

The closing member 13 may be secured to the container 1 by the sealing member 14 so as to close the opening 15 as in FIGS. 4 and 5, for example. Also, the sealing member 14 provided in the closing member 13 may close the opening 15, or the closing member 13 and the sealing member may close the opening 15 in cooperation with each other. Further, the closing member may be provided with a tab or a handle for making it easier to pull the closing member 13.

When the closing member 13 is detached from the container 1, only the closing member 13 may be detached by applying a force on the closing member 13, the closing member 13 and the sealing member may be detached at the same time, or the closing member 13 may be detached by removing the sealing member 14. Also, the closing member 13 can be made to have a sliding structure or the like.

When the closing member 13 is mounted to the container 1 by a screw structure, the opening 15 and the closing member 13 can be preliminarily processed into male and female thread shapes. When fastening by the screws, the sealing member 14 can also be utilized in cooperation therewith.

The lid member 2 closes the opening used for inserting the power generating element 12 in the container 1. Further, the container 1 and the lid member 2 are joined to each other, by laser welding, resistance welding, ultrasonic welding, an adhesive, and the like, for example, to seal the container 1.

Further, the positive electrode connection terminal 3 and the negative electrode connection terminal 4 can be secured to the lid member 2, the positive electrodes 21 can be secured to the positive electrode connection terminal 3, and the negative electrodes 22 can be secured to the negative electrode connection terminal 4. Thus, as illustrated in FIG. 3, the power generating element 12 can be secured to the positive electrode connection terminal 3 and the negative electrode connection terminal 4, and the power generating element 12, the positive electrode connection terminal 3, and the negative electrode connection terminal 4 can be housed within the container 1 so that the opening for inserting the power generating element 12 in the container 1 can be closed by the lid member 2.

Further, outer connection terminals 8a and 8b can be secured to the lid member 2, the positive electrode connection terminal 3 can be electrically connected to the outer connection terminal 8a, and the negative electrode connection terminal 4 can be electrically connected to the outer connection terminal 8b. Accordingly, the test battery 20 can be charged and discharged through the outer connection terminals 8a and 8b.

2. Test Battery

The test battery 20 includes the test battery case 17, the power generating element 12, and the organic electrolytic solution 16, and the power generating element 12 includes the negative electrodes 22, the positive electrodes 21, and the separator 24 interposed between the negative electrodes 22 and the positive electrodes 21, and the test battery case 17 houses the power generating element 12 and the organic electrolytic solution 16. The test battery 20 is not particularly limited as long as it is a battery which can be used for an internal short-circuit test. For example, the test battery 20 may be a lithium-ion secondary battery.

Further, the test battery 20 can also include the test metal piece 18, an elastic member 31, and a clearance adjustment member 32.

The power generating element 12 performs a battery reaction in cooperation with the organic electrolytic solution 16 charged within the test battery case 17. With such a battery reaction, it is possible to conduct charging and discharging of the test battery 20. The power generating element 12 includes the separator 24, and the positive electrodes 21 and the negative electrodes 22 which are disposed with the separator 24 therebetween. The power generating element 12 includes the separator 24 which is folded in an accordion manner, and the positive electrodes 21 and the negative electrodes 22 which are disposed in the respective trough grooves in the separator 24 and which are alternately disposed with the separator 24 therebetween, as illustrated in FIGS. 4 to 6. Although the aforementioned structure has been described herein, it is also possible to employ a wound-type structure in which a commonly-used separator 24, and positive electrodes 21 and negative electrodes 22 which are disposed with the separator 24 therebetween, are wound, or a laminated-layer type structure in which positive electrodes 21 and negative electrodes 22 which are disposed with a separator 24 therebetween are laminated on each other.

When the test battery 20 is used for a blunt nail test or a nail sticking test, there is no need for incorporating a member for an internal short-circuit in the test battery case 17, as in FIG. 4.

When the test battery 20 is used for a forced internal short-circuit test, the metal piece 18 for the forced internal short-circuit test can be disposed within the power generating element 12. The test metal piece 18 can be disposed between a positive electrode 21 or a negative electrode 22 at an outermost side and the separator 24 on an outer side thereof, as in FIGS. 5 and 6. By pressing the power generating element 12 from outside at a portion where the test metal piece 18 is provided, it is possible to cause the test metal piece 18 to penetrate through the separator 24, thereby forcibly inducing a short-circuit between a positive electrode 21 and a negative electrode 22.

A material of the test metal piece 18 is not particularly limited as long as it can be used in the forced internal short-circuit test. For example, the material of the test metal piece 18 can be metal nickel.

Further, the test metal piece 18 can be disposed between the positive electrode 21 or the negative electrode 22 and the closing member 13 or the opening 15 for the forced internal short-circuit test in the container 1. This enables pressing of a portion of the power generating element 12 where the test metal piece 18 is provided, thereby causing a short-circuit between a positive electrode 21 and a negative electrode 22 by the test metal piece 18, by inserting the short-circuit test pressing jig into the container 1 through the opening 15.

Note that, the test metal piece 18 may be inserted into the power generating element 12 by opening the test battery 20 after the test battery 20 has been charged. Also, the test metal piece 18 may be disposed within the power generating element 12 during fabrication of the test battery 20.

The test battery 20 may also include the elastic member 31 disposed between the test metal piece 18 and the closing member 13. By providing the elastic member 31, the elastic member 31 is interposed between the power generating element 12 and the closing member 13. Further, when the test metal piece 18 is disposed within the power generating element 12 during manufacture, the elastic member 31 can cover and suppress, with an appropriate force, expansion of the power generating element 12 which is caused by the disposition of the test metal piece 18. This can suppress displacement of a position of the test metal piece 18 disposed within the power generating element 12 caused by liquid injection, vibrations during manufacturing processes, and the like. Accordingly, a forced internal short-circuit test can be conducted accurately, and further, damages of the positive electrodes 21 and the negative electrodes 22 caused by the displacement of the position of the test metal piece 18 can be suppressed. The elastic member 31 can be provided as in FIG. 5, for example.

The elastic member 31 preferably has a size equal to or smaller than that of the opening 15. Accordingly, the elastic member 31 can be taken out through the opening 15, and further, the power generating element 12 can be firmly pressed with the short-circuit test pressing jig, during the forced internal short-circuit test. Further, the size of the elastic member 31 is preferably not less than 80% of an area of the opening 15. When the size of the elastic member 31 is not less than 80% of the area of the opening 15, it is possible to press the test metal piece 18 with the elastic member 31 even if the elastic member 31 is moved to some extent within the opening 15.

The elastic member 31 preferably has a thickness larger than a thickness of the opening 15 for the forced internal short-circuit test in the case 17, that is, a thickness larger than a plate thickness of the case 17 in a surface of the case 17 where the opening 15 is provided.

When the elastic member 31 has a thickness larger than the plate thickness of the case 17, the elastic member 31 can reliably cover the test metal piece 18, and thus, can suppress movement of the test metal piece 18.

The elastic member 31 is made of an elastic material, and is preferably made of a material having resistance to the organic electrolytic solution.

The elastic member 31 preferably has a strength of 20 to 90 kPa (compressive stress 25%). When the strength of the elastic member 31 falls within this range, the elastic member 31 can press the test metal piece 18 without damaging the electrodes. The elastic member 31 preferably has a thickness of about 0.8 to 5 mm. When the thickness falls within this range, the elastic member 31 can effectively press a protuberance of the test metal piece 18, so as to reduce an excessive thickness being pressed and crushed by the power generating element 12 when the thickness is too large, and prevent an excessive force from being applied on the test metal piece 18.

A material of the elastic member 31 is not particularly limited, but can be a sponge made of polyolefin, urethane, a silicone rubber, an EPDM rubber, a fluororubber or the like, or a silicone rubber, EPDM, or a fluororubber.

The test battery 20 preferably includes the clearance adjustment member 32 disposed between the battery case 17 and the power generating element 12. The clearance adjustment member 32 can press the power generating element 12 toward the elastic member 31, and can cause the power generating element 12 to be held by the elastic member 31 more firmly, whereby the power generating element 12 can be prevented from moving within the battery due to liquid flows during liquid injection and vibrations during manufacturing processes. Further, the clearance adjustment member 32 can fill a clearance positioned in an opposite side across the power generating element 12 and the opening. Thus, upon pressurization by the short-circuit test pressing jig, a stroke of pressing by the jig can be reduced, which can prevent malfunctions such as failures of transmission of a pressing force from a test device to the test metal piece 18. That is, a force is reliably transmitted to the test metal piece 18 so as to cause the test metal piece 18 to penetrate through the separator 24 and the electrodes 21 and 22, whereby the forced internal short-circuit test can be conducted with higher accuracy. The clearance adjustment member 32 can be provided as in FIG. 5, for example.

The clearance adjustment member 32 is preferably disposed at a position facing the opening 15. If the clearance adjustment member 32 is not disposed at the position facing the opening 15, the test metal piece 18 may not be reliably pressed from a back side.

The clearance adjustment member 32 preferably has a larger size than an area of the short-circuit test pressing jig which is provided in the container 1. If the clearance adjustment member 32 has a size smaller than that of the short-circuit test pressing jig, a portion of the power generating element 12 which is not provided with the clearance adjustment member 32 may be pressed and recessed. If the test metal piece 18 is located at such a recessed position, the test metal piece 18 may not properly penetrate into the separator 24 and the electrodes 21 and 22, and a test may not be conducted properly. Further, the clearance adjustment member 32 preferably has a larger area than that of the opening 15 provided in the container. When the clearance adjustment member 32 is larger than the opening 15, even if the position of the clearance adjustment member 32 is displaced to some extent, the test metal piece 18 can be reliably pressed from the back side. Thus, the test metal piece 18 can be caused to reliably penetrate through the separator 24 and the electrodes 21 and 22.

A plate thickness of the clearance adjustment member 32 can be properly determined based on a clearance between the container and the power generating element 12 in the battery, and is preferably set to a thickness of about 50 to 80% of the clearance.

The clearance adjustment member 32 is not particularly limited as long as it is made of a hard material and is made of a material having resistance to the non-aqueous electrolyte 16. For example, it can be formed from a resin plate made of polyolefin, polyphenylenesulfide, or the like.

The separator 24 has a sheet shape and is disposed between the positive electrodes 21 and the negative electrodes 22. The separator 24 is not particularly limited as long as it can prevent a short-circuit electric current from flowing between the positive electrodes 21 and the negative electrodes 22, and allows an electrolyte to pass therethrough. For example, the separator 24 can be formed from a microporous film made of polyolefin, for example.

Further, during the forced internal short-circuit test, the test metal piece 18 penetrates through the separator 24. This causes a short-circuit electric current to flow between a positive electrode 21 and a negative electrode 22 through the test metal piece 18.

The positive electrodes 21 each include a positive electrode current collector 27, and positive electrode active material layers 25 provided on the respective opposite surfaces of the positive electrode current collector 27. For example, the positive electrodes 21 can be formed as in FIGS. 7(a) and 7(b) and can be formed by forming the positive electrode active material layers 25 on the opposite surfaces of the positive electrode current collector 27 having a rectangular shape. Further, each of the positive electrodes 21 can have a connection portion 23 to be connected to a connection portion in the positive electrode connection terminal 3, and the connection portion 23 in FIG. 7(a) can be provided by not forming the positive electrode active material layers 25 on the opposite surfaces of the positive electrode current collector 27 at end portions of the positive electrode 21. A connection portion can also be provided by forming a lug portion at one end portion of the positive electrode current collector 27, and not forming the positive electrode active material layers 25 on the lug portion.

The positive electrode current collector 27 is not particularly limited as long as it has electric conductivity and can be provided with the positive electrode active material layers 25 on its surfaces. For example, the positive electrode current collector 27 can be formed from a metal foil. Preferably, the positive electrode current collector 27 is formed from an aluminum foil.

The positive electrode active material layers 25 can be formed on the positive electrode current collector 27 by a coating method or the like, from a positive electrode active material, and a conducting agent, a binding agent and the like which are added to the positive electrode active material. As the positive electrode active material, for example, lithium-transition metal composite oxides capable of reversibly extraction/insertion of lithium ions, namely, $LiCoO_2$, $LiNiO_2$, $LiNi_xCo_{1-x}O_2$ (x=0.01 to 0.99), $LiMnO_2$, $LiMn_2O_4$, $LiCo_xMn_yNi_zO_2$ (x+y+z=1), or olivine type $LiFePO_4$ and $Li_xFe_{1-y}M_yPO_4$ (wherein $0.05 \leq x \leq 1.2$, $0 \leq y \leq 0.8$, and M is at least one of Mn, Cr, Co, Cu, Ni, V, Mo, Ti, Zn, Al, Ga, Mg, B and Nb) can be used singly or as a mixture of two or more.

The negative electrodes 22 each include a negative electrode current collector 28, and negative electrode active material layers 26 provided on respective opposite surfaces of the negative electrode current collector 28. For example, the negative electrodes 22 can be formed as in FIGS. 8(a) and 8(b), and can be formed by forming the negative electrode active material layers 26 on the opposite surfaces of the negative electrode current collector 28 having a rectangular shape. Further, each of the negative electrodes 22 can have a connection portion 23 to be connected to the negative electrode connection terminal 4, and the connection portion 23 in FIG. 8(a) can be provided by not forming the negative electrode active material layers 26 on the opposite surfaces of the negative electrode current collector 28 at end portions of the negative electrode 22. A connection portion can also be provided by forming a lug portion at one end portion of the negative electrode current collector, and not forming the negative electrode active material layers 26 on the lug portion.

The negative electrode current collector 28 is not particularly limited as long as it has electric conductivity and can be provided with the negative electrode active material layers 26 on its surfaces. For example, the negative electrode current collector 28 can be formed from a metal foil. Preferably, the negative electrode current collector 28 is formed from a copper foil.

The negative electrode active material layers 26 can be formed on the negative electrode current collector 28 by a coating method or the like, from a negative electrode active material, and a conducting agent, a binding agent and the like which are added to the negative electrode active material. In a lithium secondary battery, as the negative electrode active material, for example, graphite, partially graphitized carbon, $LiTiO_4$, a Sn alloy and the like can be used singly or as a mixture of two or more.

A non-aqueous electrolyte containing a lithium salt includes a non-aqueous electrolyte and a lithium salt. As such a non-aqueous electrolyte, a non-aqueous electrolytic solution, an organic solid electrolyte, or an inorganic solid electrolyte is used. In such a non-aqueous electrolytic solution, carbonates, lactones, ethers, esters or the like can be used as a solvent, and a combination of two or more thereof can also be used as a solvent. Among them, a cyclic carbonate and a linear carbonate can be mixed and used. For example, such an organic electrolytic solution is a solution in which a lithium salt solute as an electrolyte, such as $LiCF_3SO_3$, $LiAsF_6$, $LiClO_4$, $LiBF_4$, $LiPF_6$, LiBOB, $LiN(CF_3SO_2)_2$, or $LiN(C_2F_5SO_2)_2$, is dissolved in an organic solvent. Further, as required, additives such as VC (Vinylene carbonate), PS (propane sultone), VEC (Vinyl Ethylene Carbonate), PRS (propene sultone), and a flame retardant may be added singly or as a mixture of two or more.

3. Internal Short-Circuit Test (Forced Internal Short-Circuit Test)

The test battery 20 according to the present embodiment can be used in a forced internal short-circuit test. The forced internal short-circuit test is a test for determining whether or not ignition and fuming occur, by causing a short-circuit between a positive electrode 21 and a negative electrode 22 through the test metal piece 18 disposed within the test battery case 17.

A procedure is as follows. FIGS. 9 and 10 are explanatory views of the forced internal short-circuit test.

Firstly, the fabricated test battery 20 is charged, so that the test battery 20 is brought into a state where it has accumulated electricity. Note that, the test metal piece 18 may be introduced in the fabricated test battery 20, but may not be introduced therein.

Next, as in FIG. 9, the closing member 13 is detached from the test battery case 17, thereby opening the opening 15 in the container 1. If the first elastic member 31 is provided therein, the first elastic member 31 is removed from the test battery 20. At this time, in order to prevent the organic electrolytic solution 16 from leaking through the opening 15, the closing member 13 can be detached therefrom in a state where the opening 15 is located at an upper portion. Further, if the test metal piece 18 has not been inserted in the power generating element 12 during manufacture, it is possible to insert the test metal piece 18 into the power generating element 12 at this time. Specifically, the separator 24 is preliminarily provided with a cutout for inserting the test metal piece 18 therethrough, and the test metal piece 18 is inserted into the power generating element 12 through this cutout.

Next, a short-circuit test pressing jig 35 is inserted into the test battery 20 through the opening 15, thereby pressing a portion of the power generating element 12 in which the test metal piece 18 has been inserted. Thus, as in FIG. 10, the test metal piece 18 penetrates through the positive electrode 21 or the negative electrode 22 and the separator 24, and forcibly induces a short-circuit between a positive electrode 21 and a negative electrode 22 through the test metal piece 18. Accordingly, whether or not fuming or ignition occurs due to the internal short-circuit can be determined.

(Blunt Nail Test, Nail Sticking Test)

Further, the test battery 20 according to the present embodiment can be used in a blunt nail test and a nail sticking test.

The blunt nail test and the nail sticking test are tests for determining whether or not rupture, ignition, and the like occur, due to internal short-circuits, in an event of intrusion of electrically-conductive foreign substances during manufacture, and in an event of sticking of a sharp metal such as a nail. The nail sticking test is a test using a nail with a sharp tip end, whereas the blunt nail test is a test using a nail with a rounded tip end (blunt nail).

A procedure is as follows. FIGS. 11 and 12 are explanatory views of the blunt nail test. In the nail sticking test, a nail with a sharp tip end is employed as a test nail 37 illustrated in FIGS. 11 and 12.

Firstly, the fabricated test battery 20 is charged, so that the test battery 20 is brought into a state where it has accumulated electricity.

Next, as in FIG. 11, the closing member 13 is detached from the test battery case 17, thereby opening the opening 15 in the container 1. At this time, in order to prevent the organic electrolytic solution 16 from leaking through the opening 15, the closing member 13 can be detached therefrom in a state where the opening 15 is located at an upper portion.

Next, an internal short-circuit test nail 37 is inserted into the test battery 20 through the opening 15, thereby sticking the nail 37 into the power generating element 12. Thus, as in FIG. 12, the nail 37 penetrates through the positive electrode 21 or the negative electrode 22 and the separator 24, and forcibly induces a short-circuit between a positive electrode 21 and a negative electrode 22 through the nail 37. Accordingly, whether or not fuming, ignition and rupture occur due to internal short-circuits can be determined.

EXAMPLES

A negative electrode active material layer slurry containing graphite as an active material, and SBR and CMC as binders was applied to a copper foil and then dried to form negative electrodes 22. A positive electrode active material layer slurry containing an olivine type lithium iron phosphate as an active material, carbon as an electrically conductive material, and PVdF as a binder was applied to an aluminum foil, and then dried to form positive electrodes 21. A separator 24 having a sheet shape was placed between the positive electrodes 21 and the negative electrodes 22 to assemble a power generating element as in FIG. 6, such that an outermost electrode corresponds to a negative electrode. Further, a test metal piece 18 was placed on an outermost negative electrode 22. The separator 24 was taped at its ends by a polyimide tape, thereby producing a power generating element 12.

The positive electrode connection terminal 3 and the negative electrode connection terminal 4 were mounted to end portions of the positive electrodes 21 and to end portions of the negative electrodes 22, respectively, in the power generating element 12, to form a structure as in FIG. 3. This structure was housed together with the elastic member 31 and the clearance adjustment member 32 within the test battery case 17, and a non-aqueous electrolytic solution was injected therein, to fabricate a 160 Wh test battery.

The container 1 was formed by a rectangular-shaped case made of stainless steel (with a plate thickness of 0.8 mm) having a longitudinal length of 98 mm, a lateral length of 165.5 mm, and a thickness of 43.5 mm, and an opening in the container 1 had a circular shape of 1.9 mmφ. An interior clearance in a thickwise direction between the container 1 and the power generating element 12 was about 4.5 mm.

The closing member 13 was formed by a thin plate made of stainless steel having a thickness of 0.1 mm and a size of 30 mmφ with a tab. The closing member 13 was attached to the container 1 by performing ultrasonic welding on a periphery thereof.

As the elastic member 31, polyethylene foam (compressive stress 25%: 50 kPa) having a thickness of 3 mm and having the same shape and size as those of an opening 15 in the test battery case 17 was used. As the clearance adjustment member 32, a 3 mm polypropylene plate was used.

The test battery was charged, and the closing member 13 and the elastic member 31 were detached from the test battery. Further, it was determined whether or not the test metal piece 18 had been displaced, which revealed that the test metal piece 18 was held at the position where it was originally installed.

The short-circuit test pressing jig 35 was formed by a rectangular column made of stainless steel with sides of 10 mm, and an acrylic cubic member with sides of 5 mm which is attached to a tip end of the rectangular column with a nitrile rubber having a thickness of 2 mm interposed therebetween.

A forced internal short-circuit test was conducted, by pressing the test metal piece 18 by an acrylic surface (its pressurization surface having an area of 25 $mm^2$) of the short-circuit test pressing jig 35. After the pressing, a pressurized portion of the power generating element 12 was observed, which revealed that the test metal piece 18 was completely embedded within the power generating element 12.

DESCRIPTION OF REFERENCE SIGNS

- 1: Container
- 2: Lid member
- 3: Positive electrode connection terminal
- 4: Negative electrode connection terminal
- 6a, 6b: Screw member
- 8a, 8b: Outer connection terminal
- 10a, 10b: Outer insulation member
- 11a, 11b: Inner insulation member
- 12: Power generating element
- 13: Closing member
- 14: Sealing member (joining member)
- 15: Opening
- 16: Organic electrolytic solution
- 17: Test battery case
- 18: Test metal piece
- 20: Test battery
- 21: Positive electrode
- 22: Negative electrode
- 23: Connection portion
- 24: Separator
- 25: Positive electrode active material layer
- 26: Negative electrode active material layer
- 27: Positive electrode current collector
- 28: Negative electrode current collector
- 29: Active material uncoated portion
- 31: Elastic member
- 32: Clearance adjustment member
- 35: Short-circuit test pressing jig
- 37: Test nail

What is claimed is:

1. A test battery comprising a container, a closing member detachably secured to the container, an electrode assembly, and a non-aqueous electrolyte, wherein
   the electrode assembly comprises a negative electrode, a positive electrode, and a separator interposed between the negative electrode and the positive electrode,
   the container houses the electrode assembly as well as the non-aqueous electrolyte,
   the container has a through-hole for an internal short-circuit test, the through-hole being closed by the closing member,
   the through-hole for the internal short-circuit test is separated from an opening for inserting the electrode assembly into the container, and the through-hole for the internal short-circuit test is adjacent to the electrode assembly and overlaps with the electrode assembly,
   the test battery further comprising a test metal piece, an elastic member, and a clearance adjustment member, wherein the test metal piece is disposed between the closing member and the negative electrode or the positive electrode, or between the separator and the negative electrode or the positive electrode; the elastic member is disposed between the test metal piece and the closing member; the clearance adjustment member is disposed between the container and the electrode assembly; the electrode assembly is interposed between the clearance adjustment member and the elastic member, and wherein the electrode assembly is pressed toward the through-hole by the clearance adjustment member.

2. The test battery according to claim 1, further comprising a sealing member, wherein the sealing member seals a gap between the container and the closing member.

3. The test battery according to claim 1, wherein the closing member comprises a tab or a handle.

4. The test battery according to claim 1, wherein the container is made of a rigid material.

5. The test battery according to claim 1, further comprising a positive electrode connection terminal and a negative electrode connection terminal, wherein
   the positive electrode is electrically connected to the positive electrode connection terminal,
   the negative electrode is electrically connected to the negative electrode connection terminal,
   the positive electrode comprises a positive electrode active material layer capable of extraction/insertion of lithium ions,
   the negative electrode comprises a negative electrode active material layer capable of extraction/insertion of lithium ions, and
   the non-aqueous electrolyte is a solution prepared by dissolving a lithium salt solute in an organic solvent.

* * * * *